Dec. 12, 1961  J. A. WOOLDRIDGE ET AL  3,012,568
LIQUID PIPELINE SECTIONS
Filed Oct. 14. 1958
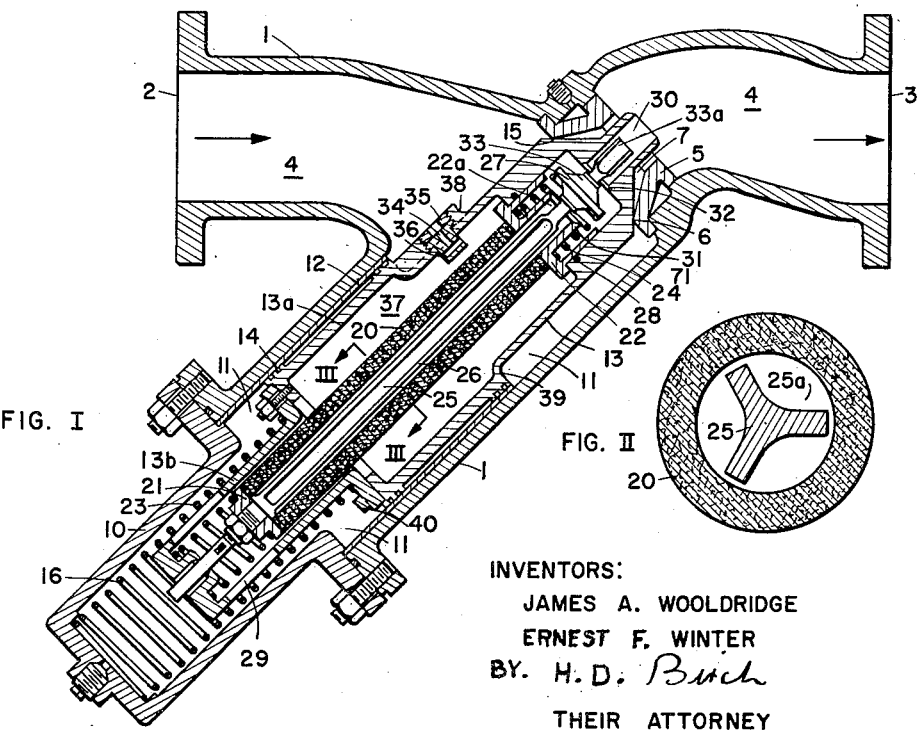
FIG. I
FIG. II
INVENTORS:
JAMES A. WOOLDRIDGE
ERNEST F. WINTER
BY. H. D. Busch
THEIR ATTORNEY ns3,012,568
LIQUID PIPELINE SECTIONS
James A. Wooldridge, Betchworth, and Ernest F. Winter, Upton by Chester, England, assignors to Shell Oil Company, a corporation of Delaware
Filed Oct. 14, 1958, Ser. No. 767,214
Claims priority, application Great Britain June 13, 1958
1 Claim. (Cl. 137—172)

The present invention relates to liquid pipeline sections, and while it is generally applicable to pipeline sections for use in systems for the transfer of liquids which are immiscible or substantially immiscible with water, it is particularly applicable to pipelines which are used for the transfer of hydrocarbon fuels from one reservoir to another, for example, for the transfer of aviation fuel from a refueling tanker or a hydrant refueling system to the storage tanks of an aircraft. References to liquids in this specification are to be understood to be confined to those liquids which are immisicible or substantially immiscible with water.

Particularly in cases such as the example quoted in which a hydrocarbon oil, such as aviation kerosene, is being delivered to a tank, in say an aircraft, from which it will eventually be drawn for use as a fuel, it may be important that the oil being delivered should not contain free water. However, contamination with water can and occasionally does occur at some stage before deliver to the tank and while certain procedures may be laid down for detecting the presence of water in the oil in the storage tank from which it is transferred, and for preventing its transference to the tank receiving the oil, an automatic mechanical safeguard to stop the flow of oil as soon as it is found to contain water, is preferred.

Pipeline sections including such a safeguard are described in U.S. Patent No. 2,842,152, issued July 8, 1958, use being made of certain filter packs which consist in a mass of filter material, for example, impregnated filter paper, which mass will permit the passage of liquid other than water through it, but absorbs water carried in the liquid stream, and is so arranged that on so doing it swells sufficiently to produce a mechanical movement sufficient for the operation of a suitable form of valve. Alternatively, the pack may be constrained so that change of its external dimensions on absorbing water is wholly or partially prevented, the swelling on contact with water then resulting in a closing up of the fluid flow passages through the pack and an increase of the pressure drop across it which may be caused to actuate some suitable mechanism. With some filter materials in fact the second effect is the more prominent, the absorption of water giving rise to only slight increase of dimensions but to a considerably increased resistance to flow. All such filter packs will be referred to in this specification as "filter packs of the kind specified." One form of filter pack of the kind specified consists of a pile or pack of annular filter papers compressed between end plates and mounted on a rod passing through the center channel of the pack. In operation, liquid flows through the pack either from outside the external cylindrical surface to the center channel within, or in the reverse direction, the general direction of the flow thus being parallel to the planes of the filter papers and not through them in the conventional manner.

It is an object of the present invention to provide pipelines and pipeline sections which include such an automatic safeguard against the passage of free water through them and are comparatively compact and also sensitive, that is to say quick in responding to the advent of small quantities of water.

According to the present invention a liquid pipeline section is provided with a valve seat encircling the liquid passage through the section, a valve member in the form of a sleeve having an external surface adapted to fit against the valve seat and block the liquid passage through it, which sleeve projects into the section from a closed branch in which it is mounted so as to be able to slide towards and away from the valve seat while maintaining a liquid-tight seal between its external surface and the interior surface of the branch, biasing means urging the sleeve towards the valve seat, and a filter pack of the kind specified mounted within the cavity formed within the sleeve, said cavity being sealed from the liquid passage through the section in all operational positions of the sleeve apart from one or more restricted inlet orifices communicating with said liquid passage to that side of the valve seat which in normal operation lies upstream from it, and giving access within the cavity to the inlet to the filter pack, the outlet of the filter pack communicating with said liquid passage on the other side of the valve seat through one or more outlet passages of considerably less resistance to flow than the inlet orifices, the sleeve being provided with an external surface or surfaces which is or are exposed in operation to the liquid pressure on said upstream side of the valve seat and the area and orientation of which are such that, when flow is proceeding normally through the pack, the pressure drop across the inlet orifices to the sleeve is sufficient to enable the excess external liquid pressure acting on said surface to force the sleeve away from the valve seat in opposition to the biasing means, and the filter pack being arranged so that on contact with free water it causes blockage of flow through the sleeve under which condition the sleeve is forced back against the valve seat owing to the reduced pressure around its downstream end during full flow through the section.

Where the two ends of the pipeline section are required to be in line, or approximately so, the sleeve preferably projects into the section at an acute angle to the normal direction of flow through the section, and preferably at an angle lying between 20° and 60°, in order to minimize the total pressure drop through the section when full flow is taking place. However, the sleeve and the branch may be wholly within a part of the pipeline section which is of greater cross section than the remainder.

Normally the sleeve will be of generally cylindrical shape, being provided towards the end which projects into the fluid passage through the section, with a tapering shoulder, the surface of which is adapted to fit into a circular bevelled valve seat mounted on or formed integrally with the wall of the liquid passage. The said end may be provided with a nose-piece through which the outlet passages from the filter pack pass and which projects some distance through and beyond the valve seat.

In addition the sleeve will usually fit closely within the closed branch, in the manner of piston in a cylinder, circumferential liquid seals such as O-ring seals, labyrinth seals or the like being provided to afford a liquid-tight seal around the sleeve.

The sleeve may be provided with an external surface on which excess external liquid pressure acts to force the sleeve away from the valve seat, in the form of a shoulder on its external surface directed towards the valve seat, the shoulder lying between the surface adapted to fit against the valve seat and such sealing means as is provided between the external surface of the sleeve and the interior surface of the branch.

The biasing means will usually be a spring or springs mounted to urge the sleeve towards the valve seat. In particular, it may be a single helical spring compressed between the closed end of the branch and the nearer end of the sleeve, or a suitable projection on the external surface of the sleeve at an intermediate point along its length.

The filter pack may be maintained under sufficient longitudinal compression by one or more springs acting on one or both of the end plates of the pack. Blockage of flow through the sleeve may be effected by a simple valve mechanism arranged to close the outlet passage or passages on expansion of the pack after contact with free water, or on increase of the pressure drop across it. Alternatively, the blockage may be caused simply by the pack itself, it being constrained between end plates and the swelling on contact with water being sufficient to cut-off flow.

Where the filter pack is a pack of annular filter papers compressed between end plates and mounted on a rod passing through the interior channel of the pack, the inlet orifices of the sleeve may lead to the space outside the pack, the interior channel communicating with the outlet passages.

The outlet passages must be such that under all conditions of flow the pressure drop across them is small compared with that through the inlet orifices, the latter being such that the pressure drop across them when there is normal flow through the pack, is sufficient to enable the excess external pressure acting on the surface or surfaces of the sleeve to force the latter away from the valve seat against the action of the biasing means.

In cases where the swelling of the material of the pack does not or is not allowed to give rise to expansion, the increased resistance to flow through the pack is arranged to be such that the liquid pressure inside the sleeve rises to a value such that excess external liquid pressure acting on said surface is insufficient to hold the sleeve away from the valve seat. In one particular arrangement, there may be provided a pilot valve arranged to be actuated on the occurrence of a small increase in the pressure drop across the pack to close the outlet passage or passages therefrom. This last arrangement may conveniently be one in which the inlet orifices communicate with the interior channel of the pack.

It will be appreciated that liquid pipeline sections according to the present invention may form part of some liquid flow system, for example an aircraft refueling system, the section being permanently, or at least semi-permanently, incorporated in the system. Thus the present invention also provides a liquid flow system or a liquid pipeline including a liquid pipeline section according to the present invention, said section being provided as part of a liquid flow channel or of the pipeline to stop the flow of liquid through it substantially immediately upon contact of free water-containing liquid with the pack in the section. Such a section may in particular be included in a system which also includes a filter pack of the kind specified as a filter element for removing suspended matter from the liquid, the section according to the present invention being incorporated in the system upstream of the filter element and protecting it in operation from all but very small quantities of water. The pack in a section according to this invention may be a relatively small one, and can thus afford protection for a much larger and more expensive pack which would otherwise have to be replaced on each occasion that the liquid it is used to filter contains free water.

For example, one or more liquid pipeline sections according to the present invention may be included in a mobile aircraft refueller including, for example, one or more fuel storage tanks together with appropriate pumps, valves, meters and connections for the delivery of measured quantities of fuel to one or more outlet connections. Such sections may also be included in the refueling trolleys used for connecting aircraft fuel tanks with the hydrants of a static fueling system.

While the pipeline sections have been developed in particular for use in preventing the delivery of water-contaminated fuel to aircraft, it will be appreciated that they may equally be incorporated in any other liquid flow system in which it is desired to prevent liquid contaminated by free water passing to a given point in the system.

A number of embodiments of pipeline sections according to the present invention will now be described by way of example with reference to the accompanying drawing in which FIG. I shows a longitudinal section of the two pipeline sections, and FIG. II shows a cross section of parts of FIG. I.

Referring to FIG. I of the drawing, the liquid pipeline section has a main casing 1 provided at its ends 2 and 3 with flanges to enable it to be bolted to other sections of pipeline or other allied equipment in the usual manner. It will, of course, be appreciated that any other form of coupling means may be provided if required. The two ends 2 and 3 of the section are joined by a main liquid passage 4 and the whole is designed for flow to take place in the direction of the arrows from the end 2 to the end 3. Any references in this description to directions of flow, and the use of terms such as upstream, downstream, inlet and outlet are to be understood to refer to this designed direction of flow through the section.

Fitted into the wall of the passage 4 is a ring 5, providing a beveled valve seat 6, directed towards the inlet end 2 of the section, the ring 5 also forming a Venturi-like constriction 7 in the passage 4 downstream of the valve seat 6.

The main casing 1 together with a cap 10, bolted to it so as to form a liquid-tight joint, form a closed branch 11 joining the main passage 4 at an acute angle. Fitting closely into the wider first part of the branch 11, the wall of which is lined with a steel or a polytetrafluorethylene cylindrical liner 12, is a sleeve 13 constructed in two parts 13a and 13b bolted together. The part 13a is provided with circumferential labyrinth type seals 14 bearing on the liner 12 so as to render insignificant any leakage of liquid from the passage 4 into the parts of the branch 11 lying behind the seals 14. The front end of the sleeve part 13a is provided with a tapering shoulder 15 of such a shape as to fit against the valve seat 6, when in the closed position shown in FIG. I, and block the passage 4. A helical spring 16 compressed between the closed end of the branch 11 and the end flange of the sleeve part 13b urges the sleeve 13 towards the valve seat 6. The spring 16 could alternatively act against the nearer end of the part 13b or any other suitably directed surface on it or any attachments to it.

The sleeve 13 contains a filter pack of the kind specified comprising a pack 20 of annular filter papers (indicated only diagrammatically in the drawing) which will swell on contact with only small amounts of free water, to produce a longitudinal expansion of the pack 20. The pack 20 is compressed between end plates 21 and 22 by helical springs 23 and 24, a central rod 25 running through the interior channel 26 of the pack being secured to the end plate 21 and to a disc 27 which is forced away from the end plate 22 by the springs 23 and 24. The end plate 22 is fitted into the end of the interior of the sleeve part 13a, and O-ring seal 28 being provided to prevent leakage through the joint, and has a central channel 22a through which the rod 25 passes with free clearance. The rod 25 is shown in section in FIG. II (not to scale) and has three grooves 25a cut in it to increase the cross section of the interior channels through the pack 20. The end of the rod 25 remote from the channel 4 is supported by, but slides freely through a guiding hole in the end cap of the sleeve part 13b, while openings 29 are provided in the wall of the part 13b to enable liquid to flow in and out of the end of the branch 11 as the sleeve 13 moves.

The nose of the sleeve 13 projects through and beyond the valve seat 6 and contains a liquid flow channel 30 which is the outlet passage from the interior of the sleeve, being continuous with the interior channel 26 of the pack 20 and opening into the main channel 4 downstream of the valve seat and the constriction 7. The outlet from the central channel 22a through the end plate 22, and the entrance to the channel 30 are provided with valve seats 31 and 32, respectively, co-acting valve members 33 being mounted on each side of the disc 27 on the pack rod 25. When the pack 20 expands longitudinally the disc 27 is drawn towards the end plate 22, until the outlet from the channel 22a is blocked by the appropriate valve member 33 coming up against the seat. Similarly, the inlet to the channel 30 becomes blocked by the other valve member 33, in the event that there is no pack 20 in position, the springs 23 and 24 then forcing the disc 27 hard towards the channel 30. This latter is a precaution to prevent passage of liquid through a section from which the pack 20 has been removed.

Liquid from the upstream side of the valve seat 6 can flow into the interior of the sleeve 13 through a small inlet orifice 34 in the orifice plug 35 mounted in the wall of the sleeve part 13a, which is thickened by a projection 38 for this purpose. The inner end of the orifice plug 35 is provided with a transverse passage 36 in order to spread the flow into the space 37 surrounding the exterior of the pack 20. The exterior of the sleeve part 13a is provided with a shoulder 39 directed towards the valve seat 6 and lying between the shoulder 15 and the nearer one of the seals 14. This shoulder 39 is thus exposed to the pressure of the liquid in the passage 4 upstream of the valve seat 6, the resultant force on the sleeve 13 having a component in a direction such as to tend to move the sleeve 13 away from the valve seat 6.

In operation, assuming the section is connected in a pipeline system for supplying, for example, aviation kerosene to aircraft storage tanks and starting from the condition in which the section is full of liquid but with the delivery valve downstream of the section closed so that there is thus no flow of liquid, the pressure throughout the section, i.e. in the main passage 4 and everywhere within the sleeve 13, is equal. The shoulder 15 on the sleeve 13 will thus be held against the valve seat 6 by the spring 16 which should be sufficiently strong to carry out that function against the action of gravity, if need be.

If, now, the delivery valve is opened there will be a reduction of pressure on the downstream side of the valve seat 6, leading to a flow of liquid through the pack 20, the complete path being through the orifice 34, the space 37, the pack 20, the central channel 26 of the pack 20, the channel 22a and the channel 30. The orifice 34 is of much smaller cross section area than the outlet from the pack 20 through the channels 26, 22a and 30, so that the greater part of the total pressure drop will occur across the orifice 34. The excess external pressure acting on the shoulder 39 of the sleeve 13 therefore produces a force on the sleeve 13 which acts in opposition to the spring 16 and is of sufficient magnitude to lift the sleeve 13 off the valve seat 6 and force it back into the branch 11 until the stop 40 is brought up against the flange of the cap 10, leaving the main liquid passage 4 through the section substantially clear. This force is sufficient to hold the sleeve 13 back despite the opposite effect of the reduced pressure around the downstream end of the sleeve 13 due to the venturi constriction 7 and the restriction of flow that occurs through the valve seat 6 around that end of the sleeve 13. Flow then continues uninterrupted, for example, some 240 U.S. gallons per minute passing in all through the section of which some ⅝ g.p.m. passes through the pack 20. If flow is shut down, pressure will equalize throughout the section again, and the sleeve 13 will move into contact with the valve seat 6 against which it is then held by the spring 16. The pressure drop created by the venturi-like constriction 7 when full flow is taking place, also serves to ensure sufficient flow of liquid through the pack 20, otherwise there would be a tendency for the sleeve 13 not to move away from the seat 5 to the fullest extent possible and thus to cause an unacceptable pressure drop across the section as a whole.

If while the flow is in progress, liquid containing free water suspended in it arrives in the section, the water on contact with the pack 20 will cause it to swell, the resultant expansion forcing the end plate 21 away from the fixed end plate 22 against the action of the springs 23 and 24. The plate 21 being integral with the rod 25 and the disc 27, the latter is pulled against the outer end of the plate 22, the channel 22a being closed by seating of the valve member 33 against the seat 31. This stops the flow through the pack 20 and thus through the orifice 34. As the flow stops, the pressure drop across the orifice 34 decreases and the pressure inside the sleeve 13 thus increases. The force holding the sleeve 13 away from the valve seat 6 therefore decreases and the sleeve 13 is drawn in against the seat 6 owing to the reduced pressure at its downstream end and is held there by the biasing spring 16. Acceleration of the valve closing action is caused by the further reduction of pressure on the downstream side of the valve seat 6 due to the increasing pressure loss over the tapered shoulder 15 as the sleeve 13 approaches the seat 6.

We claim as our invention:

A pipeline section for liquid hydrocarbon flow comprising: a main section, a closed end branch section joining said main section, a main valve seat encircling the liquid passageway through the main section, a hollow piston-shaped valve member having an axial outlet and having an external shoulder facing away from the closed end of the branch section closely and slidably fitted against the interior wall of said branch section and seating at one end portion upon said main valve seat, a spring mounted in said branch section urging the piston-shaped valve member toward said main valve seat, and externally mounted filter pack means on the inside of said hollow piston-shaped valve member, said filter pack means comprising an annular water-sensitive filter member held between end plates and having an axial space, a restrictive orifice means through the wall of said piston-shaped valve member forming the sole passageway between the outside of said piston-shaped valve member and the outside surface of said filter element, the inside of said filter element forming the sole passageway to said axial outlet, means forming a chamber at the outlet end of said hollow piston-shaped valve member, said chamber having an inlet communicating with the interior of said filter and an outlet vent communicating with said axial outlet, flow control means in said chamber cooperating with one of the end plates to control flow of fluid from said orifice through said filter and from the interior of said filter to said axial outlet, in accordance with the water sensed by said filter as the fluid flows therethrough, said axial outlet discharging downstream into the main section in the area of said main valve seat, said flow control means comprising secondary valve means controlled by said one filter end plate to close said inlet when water is sensed by said filter element and to close said outlet vent when said filter is absent.

References Cited in the file of this patent

UNITED STATES PATENTS

| | | |
|---|---|---|
| 1,848,031 | Spencer | Mar. 1, 1932 |
| 2,000,297 | Putnam | May 7, 1935 |
| 2,172,855 | Siegert | Sept. 12, 1939 |
| 2,619,112 | Renick | Nov. 25, 1952 |
| 2,633,869 | Plank | Apr. 7, 1953 |
| 2,842,152 | Winter et al. | July 8, 1958 |
| 2,887,295 | Bredtschneider | May 19, 1959 |